Feb. 16, 1932.   G. H. PETRI   1,845,097
FORMING MACHINE FOR PLASTIC MATERIAL
Filed May 21, 1930
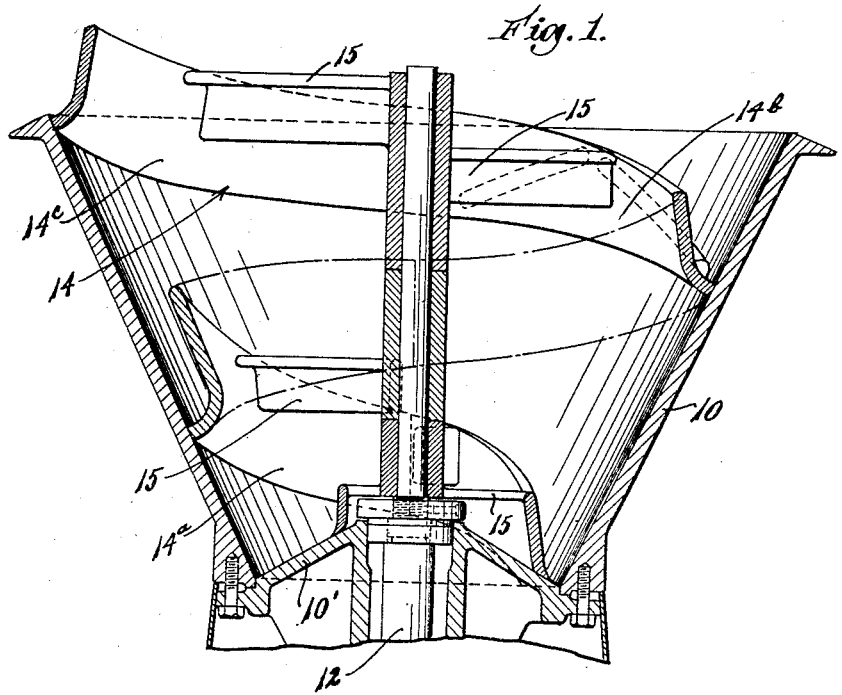
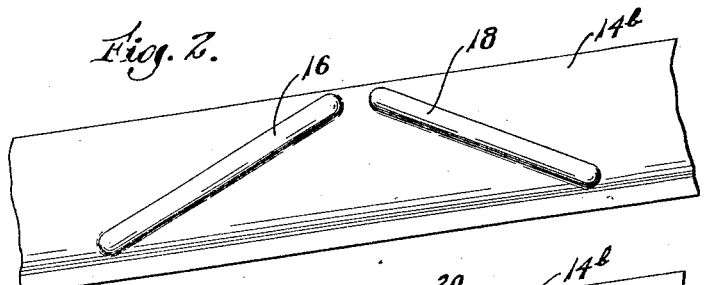
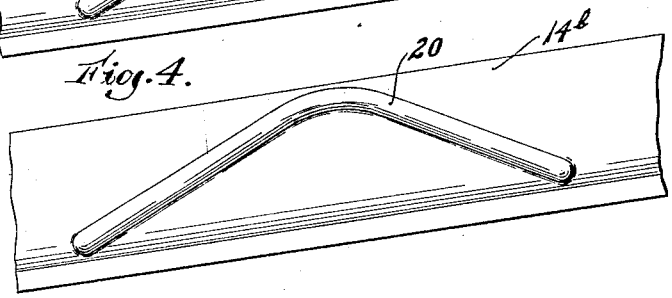
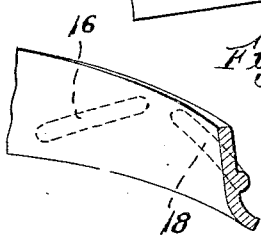
Inventor
Gunther H. Petri
by Mitchell, Chadwick & Kent
Attorneys Patented Feb. 16, 1932

1,845,097

UNITED STATES PATENT OFFICE

GUNTHER H. PETRI, OF BOSTON, MASSACHUSETTS

FORMING MACHINE FOR PLASTIC MATERIAL

Application filed May 21, 1930. Serial No. 454,272.

This invention relates to improvements in forming machines for plastic material. More especially it relates to dough rounders wherein masses of plastic dough are made to traverse a suitable trough in order that they may be rounded and kneaded, by contact with the trough walls, into form and consistency ready for baking into loaves of bread or into rolls, as the case may be. The invention provides so that gases present in the plastic masses may be eliminated by a more complete and thoroughgoing treatment than has characterized the action of rounding machines as heretofore constructed; and also provides so that a greater degree of density for the rounded dough balls may be attained, and the general texture of the balls be materially improved.

A particular design of rounder to which the invention readily may be applied is disclosed in my United States Patent No. 1,592,154, granted July 13, 1926, in which masses of dough are caused to roll along a helical U-shaped trough whose opposing walls are respectively constituted by a stationary dough race and a rotating conical kneading table. Heretofore it has been proposed to have a projecting rib extending at an incline along and across the working face of the stationary wall of such a rounder, so that masses of dough become subjected to added pressure while passing the rib, and gases therein become to a certain extent eliminated. But this structure fails to solve satisfactorily the problem of eliminating the blisters of gas. Some of them are likely to remain unexploded when the particular dough mass passes beyond the rib, and these get turned back into the dough mass at subsequent stages of the rounding process. Later some of these blisters burst, through upward pressure, and so-called bleeding of the dough ball takes place.

It is the object of the present invention to provide for a more complete elimination of gases from dough masses, in the course of their travel through a rounding machine, as compared with devices for this purpose heretofore known. A feature of importance is that whereby every blister of gas, large enough to be of consequence, is pursued and gradually squeezed by the device of the invention, by downward compression to the point of bursting of the blister. The applying of the pressure downward will at the same time seal the bleeding part of the dough ball. The purpose is that no blisters of material size shall remain when the mass passes beyond the zone of squeezing. Simplicity of construction and operation; and adaptability for easy, low-cost embodiment in rounders as now used, are other features of practical importance.

These ends may be attained by providing, on the working face of the stationary dough race wall, at a suitable location along the trough of the rounder, a pair of ribs, or several pairs of ribs, each rib extending diagonally across the race-wall, one rib of each pair extending with forward incline from bottom to top, while the other of the same pair is located beyond the first and extends with forward incline from top to bottom.

A mass of dough in its travel through the rounder encounters first the lower portion of the first rib, by which the lower part of the mass is squeezed more than are adjacent parts of the dough; and then the mass is engaged by that rib progressively at points along the rib toward the top of the race wall. Meanwhile the regular "rounding" action of the machine is proceeding by which the ball is being moulded and its skin stretched and turned inward upon itself; and in addition this zone of compression of the mass by the rib travels upward through the mass. After this the dough passes into engagement with the second rib. Successive points of this rib exert a compression on the mass at a zone whose location moves progressively downward through the mass, tending to squeeze the mass toward the bottom of the race-wall. Thus the dough masses are acted upon by each rib with rolling-pin effect, and blisters of gas which remain unexploded after the action of the first rib, are pursued by the second and squeezed to the bursting point; and the mass is treated so as to close the bleeding or open part of the dough ball before the particular dough mass passes beyond the zone of squeezing. Considerably less gas is permitted to remain in a rounded dough ball, as compared with what has been usual heretofore, and a generally closer texture for the balls is attained.

It is intended that the patent shall cover, by suitable expression in the appended claims, whatever features of patentable novelty exist in the invention disclosed.

In the accompanying drawings:

Figure 1 is a medial section of a conical dough rounder having a dough race embodying the present invention;

Figure 2 is a face view of a fragment of the race wall of Figure 1, showing one form of my improved two-way squeezing ribs;

Figure 3 is a cross-section of the race wall of Figure 2; and

Figure 4 is a view similar to Figure 2 but showing a modified form of rib.

Referring to the drawings, a conical kneading table or bowl 10 is supported rotatably on a stationary standard 12 around which it is adapted to be revolved by any suitable means (not shown). Standard 12 serves also as the support for a spiral and helical dough race 14 which, as illustrated, comprises sections 14$^a$, 14$^b$ and 14$^c$, each of which is carried by a supporting arm 15 extending outward from the standard.

The lowest section 14$^a$ of the race begins close to standard 12 and progresses thence outward, leading first helically and spirally downward, close over the convex surface of the conical bottom 10'. When the bottom edge of this race section has reached a position close to the concave face of the table, the race section continues spirally outward but turns helically upward in close relation to the table surface until, in the instance illustrated, it has progressed about three-fourths way around the standard. This section of race is of the usual configuration, having a dough engaging face which stands upward at such an angle, diverging from the face of the table or bowl, as to form in conjunction therewith a somewhat U-shaped trough for the dough. At its discharge end this section 14$^a$ substantially registers with the receiving end of the succeeding section 14$^b$, which in turn likewise delivers to section 14$^c$.

According to the invention a pair of diagonally disposed ribs 16, 18 are provided on the race wall at a suitable or any desired location along the trough. They are here shown as being carried by the race section 14$^b$. Rib 16 extends forward and upward across the race wall from bottom toward top; and rib 18, further along the race, extends forward and downward across the race-wall from top toward bottom. The ribs, in the preferred form, are shown spaced apart a little distance, but they may be made as one continuous rib 20 having an angular course, as seen in Figure 4.

Dough masses fed into the lower and first section 14$^a$ of the race are rolled along the trough, being rounded and kneaded continuously by the cooperating forward pull of the horizontally moving bowl wall, and resisting backward pull of the stationary but upwardly inclined race wall. These two pulls are applied by surface frictional engagement and, act in opposite directions on opposite sides of the mass to produce the rolling action, which is modified by the inclination of the race, as is already known. But as a dough ball comes to the ribbed portion of section 14$^b$ of the race, it engages first the lower end of rib 16 and then successively at points along that rib toward its top. The added lateral pressure thus applied to the dough forces gases from the mass, squeezing blisters to the breaking point. When the dough ball reaches the end of rib 16, there may be some blisters not yet exploded. The second rib 18 catches the mass containing these remaining bubbles, and presses and pursues the blisters downward; and gradually squeezes them and frees the gases. Thence the dough ball passes on to a normal stretch of the race. The finished balls have greater density and a generally improved texture.

The invention is not limited in application to the particular type of rounder illustrated, as it may be applied to other types of conical rounders. And as many pairs of ribs 16, 18, as is deemed practical or desirable may be employed without departing from the scope of the invention. These may be placed in multiple,—a plurality of upward extending ribs followed by a plurality of downward extending ribs,—or in series, with one single upward and downward pair succeeding another.

I claim as my invention:

1. In a forming machine for plastic material having a moulding table with a race extending thereover and forming therewith a trough for said material, one of said elements of the trough being movable relative to the other thereby to round up masses of the material engaged between them, the combination, with said table and race and a rib slanting upward across the race, of a second rib following the first and slanting downward across the race, by which latter rib compressing and concentrating forces are applied progressively to the mass stretched by the first rib.

2. A forming machine for plastic material comprising a moulding table with a race extending thereover and forming therewith a trough for said material, one of said elements of the trough being movable relative to the other thereby to round up masses of the material engaged between them; and a rib standing out toward the table from the face of the race and slanting across said race from top to bottom thereof in direction along the race toward the race outlet.

3. A forming machine for plastic material comprising a moulding table with a race extending thereover and forming therewith a trough for said material, one of said elements of the trough being movable relative to the other thereby to round up masses of the material engaged between them; and a pair of ribs standing out toward the table from the face of the race and slanting across said race face successively in opposite directions.

Signed at Boston, Massachusetts, this twentieth day of May, 1930.

GUNTHER H. PETRI.